(12) United States Patent
Pande et al.

(10) Patent No.: US 11,769,194 B2
(45) Date of Patent: Sep. 26, 2023

(54) METHOD AND SYSTEM FOR PRESENTING ITEMS IN ONLINE ENVIRONMENT BASED ON PREVIOUS ITEM SELECTIONS

(71) Applicant: Target Brands, Inc., Minneapolis, MN (US)

(72) Inventors: Amit Pande, Ames, IA (US); Jacob Portnoy, Minneapolis, MN (US); Ryan Siskind, Minneapolis, MN (US); Brian Copeland, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 275 days.

(21) Appl. No.: 16/160,727

(22) Filed: Oct. 15, 2018

(65) Prior Publication Data

US 2019/0385213 A1  Dec. 19, 2019

Related U.S. Application Data (60) Provisional application No. 62/686,294, filed on Jun. 18, 2018.

(51) Int. Cl.
    *G06Q 30/0601*  (2023.01)
    *G06Q 30/0207*  (2023.01)
    *G06Q 30/0201*  (2023.01)

(52) U.S. Cl.
    CPC ..... *G06Q 30/0631* (2013.01); *G06Q 30/0201* (2013.01); *G06Q 30/0224* (2013.01); *G06Q 30/0643* (2013.01)

(58) Field of Classification Search
    CPC .......... G06Q 30/0631; G06Q 30/0201; G06Q 30/0224; G06Q 30/0643; G06Q 30/0601–0645

USPC ...................................... 705/26.7, 26.1–27.2
See application file for complete search history.

(56) References Cited

U.S. PATENT DOCUMENTS

| | | | |
|---|---|---|---|
| 6,370,513 B1 | 4/2002 | Kolawa et al. | |
| 6,865,546 B1 | 3/2005 | Song | |
| 2002/0143664 A1 | 10/2002 | Webb | |
| 2002/0161670 A1* | 10/2002 | Walker | G06Q 30/02 705/26.1 |
| 2007/0271141 A1 | 11/2007 | Storm | |
| 2010/0076811 A1* | 3/2010 | Keller | G06Q 30/0243 705/7.29 |
| 2010/0114654 A1 | 5/2010 | Lukose et al. | |
| 2011/0145051 A1 | 6/2011 | Paradise et al. | |
| 2012/0005044 A1* | 1/2012 | Coleman | G06Q 30/02 705/27.2 |
| 2013/0290234 A1* | 10/2013 | Harris | G06N 5/022 706/46 |

(Continued)

OTHER PUBLICATIONS

PRedicting grocery purchase behavior—pt. 1, Paige McKenzie, Dec. 12, 2017 (Year: 2017).*

*Primary Examiner* — Marissa Thein
*Assistant Examiner* — Anna Mae Mitros
(74) *Attorney, Agent, or Firm* — Merchant & Gould P.C.

(57) ABSTRACT

Methods and systems for predicting relevant items to be presented to a user in an online environment are described. The methods and systems described herein generate models based on previous item selections to determine an overall time series model for predicting a relevant time of next item selection as well as items most likely to be selected at that time. Complementary items can be presented to the user alongside the selection of most relevant items.

18 Claims, 9 Drawing Sheets

(56) References Cited

U.S. PATENT DOCUMENTS

| | | | |
|---|---|---|---|
| 2014/0052562 A1 | 2/2014 | Oliveira et al. | |
| 2014/0310078 A1* | 10/2014 | Andriyanenko | G06Q 30/0226 |
| | | | 705/14.14 |
| 2015/0134413 A1* | 5/2015 | Deshpande | G06Q 30/0202 |
| | | | 705/7.31 |
| 2017/0156540 A1* | 6/2017 | Wheatley | B67D 1/0019 |
| 2017/0300948 A1 | 10/2017 | Chauhan et al. | |
| 2017/0323022 A1* | 11/2017 | Miranda | H04L 67/025 |
| 2018/0189823 A1* | 7/2018 | Xie | G06Q 30/0246 |

* cited by examiner

Guest A: John
bought
Item B: Yogurt
on

| | | Date Seq | DATE DIFF | Qty | Rate |
|---|---|---|---|---|---|
| 2017-04-01 | 4oz Chobani pack of 4 | 1 | | 16 | 1 |
| 2017-04-17 | 32oz Dannon Non-fat | 17 | 16 | 32 | 2.28 |
| 2017-05-01 | 32oz Simply Balanced | 31 | 14 | 32 | 2.28 |
| 2017-05-15 | 4oz Chobani pack of 4 | 45 | 14 | 16 | .94 |
| 2017-06-01 | 32oz Dannon Non-fat | 62 | 17 | 32 | 1.68 |
| 2017-06-20 | 32oz Dannon Non-fat | 81 | 19 | 32 | 1.52 |
| 2017-07-01 | 64oz Market Pantry | 92 | 21 | 64 | ? |
| | | | ? | | |

Date diff estimate: 23
2017-07-24

Rate est: 1.47
Date diff est: 64/1.47=43
Next purchase: 2047-08-14

FIG. 3

| DPC | Today | guest id | sls_d | censored | time_to_next | trip_nr |
|---|---|---|---|---|---|---|
| 112847 | 2017-05-10 | 100641781110000000 | 2016-10-17 | 0 | 97 | 1 |
| 112847 | 2017-05-10 | 100641781110000000 | 2017-01-22 | 0 | 7 | 2 |
| 112847 | 2017-05-10 | 100641781110000000 | 2017-01-29 | 1 | 101 | 3 |

FIG. 4

| DPC | day | n_risk | n_event | n_censor | hazard | cum_hazard | survival |
|---|---|---|---|---|---|---|---|
| 87317 | 1 | 526000 | 1220 | 224 | 0.0023 | 0.0023 | 0.9977 |
| 87317 | 2 | 518598 | 2446 | 243 | 0.0047 | 0.0071 | 0.9930 |
| 87317 | 3 | 515868 | 3417 | 0 | 0.0066 | 0.0137 | 0.9864 |
| 87317 | 4 | 512461 | 4488 | 106 | 0.0088 | 0.0224 | 0.9778 |
| 87317 | 5 | 507860 | 5754 | 194 | 0.0113 | 0.0338 | 0.9668 |
| 87317 | 6 | 501912 | 7821 | 158 | 0.0158 | 0.0496 | 0.9517 |
| 87317 | 7 | 493933 | 13360 | 205 | 0.0271 | 0.0766 | 0.9263 |
| 87317 | 8 | 480368 | 7830 | 249 | 0.0165 | 0.0931 | 0.9111 |
| 87317 | 9 | 472289 | 5803 | 244 | 0.0123 | 0.1054 | 0.9000 |

FIG. 12

METHOD AND SYSTEM FOR PRESENTING ITEMS IN ONLINE ENVIRONMENT BASED ON PREVIOUS ITEM SELECTIONS

CROSS-REFERENCE TO RELATED APPLICATIONS

The present application claims priority from U.S. Provisional Patent Application No. 62/686,294, filed on Jun. 18, 2018, the disclosure of which is hereby incorporated by reference in its entirety.

BACKGROUND

In a retail environment, a large percentage of items that are sold, in aggregate, are repeated purchases, and in particular, purchases made by a user on a regular or semi-regular basis. In an online retail environment, a user may be presented with a selection of past purchases, e.g., on a front page of a website, so that user may easily select items that the user purchased in the past. However, often the selection of items presented to that user can be inaccurate as to what the user is seeking. For example, the item selection may include only items that were purchased online, without accounting for items purchased at a physical store location. Still further, the items that were previously purchased may be re-presented to the user without regarding to the quantity of the item that is presented to the user or without regard to how much time has passed since a purchase of that item. Accordingly, a user may be presented with items that the user has recently purchased (and is therefore unlikely to repurchase currently) or may not be presented with items of interest, since those item purchases were not captured for purposes of providing recommendations.

SUMMARY

In general, methods and systems for predicting relevant items to be presented to a user in an online environment are described. The methods and systems described herein generate models based on previous item selections to determine an overall time series model for predicting a relevant time of next item selection as well as items most likely to be selected at that time. Complementary items can be presented to the user alongside the selection of the most relevant items.

In particular, in a first aspect, a method of generating an item recommendation to a user includes identifying sales associated with a retail customer and classifying the sales into item level data. For each item in the item level data, an item category is identified and for each guest and each item category, a time-series model of purchases is built. The method includes determining, from the time-series model of purchases for the retail customer and item category, one or more model features and generating a plurality of time-series models from the one or more model features using an autoregressive integrated moving average (ARIMA), the plurality of time-series models including a date model and a rate model. The method further includes performing a survival analysis to determine a repurchase probability of an item within each item category, and generating an ensemble model from the date model, the rate model, and the survival analysis, the ensemble model providing a time series prediction of a next retail customer purchase date and items purchased on the date of the next retail customer purchase. The method includes outputting a basket prediction for each retail customer, the basket prediction including at least one item within each of a plurality of the item categories, the plurality of item categories selected from among the item categories and corresponding to highest-likelihood items purchased.

In a second aspect, a retail item recommendation system is disclosed. The system includes a recommendation modeling computing system hosting a recommendation Application Programming Interface (API) exposed to a retail website server, the recommendation API configured to receive information identifying a retail customer and output a basket prediction for that retail customer. The system further includes a recommendation modeling engine executing on the recommendation modeling computing system. The recommendation modeling engine is configured to, when executed by a programmable circuit of the recommendation modeling computing system, perform: identifying sales associated with a retail customer; classifying the sales into item level data; for each item, identifying an item category; for each guest and each item category, building a time-series model of purchases; determining, from the time-series model of purchases for the retail customer and item category, one or more model features; generating a plurality of time-series models from the one or more model features using an autoregressive integrated moving average (ARIMA), the plurality of time-series models including a date model and a rate model; performing a survival analysis to determine a repurchase probability of an item within each item category; generating an ensemble model from the date model, the rate model, and the survival analysis, the ensemble model providing a time series prediction of a next retail customer purchase date and items purchased on the date of the next retail customer purchase; and outputting a basket prediction for each retail customer, the basket prediction including at least one item within each of a plurality of the item categories, the plurality of item categories selected from among the item categories and corresponding to highest-likelihood items purchased.

In yet another aspect, a retail web server is configured to provide a retail item recommendation. The system comprises a computing system comprising at least one processor communicatively connected to a memory, the memory storing computer-executable instructions comprising a software tool which, when executed causes the system to perform the following steps. Identify sales associated with a retail customer; classify the sales into item level data; and for each item, identify an item category. For each guest and each item category, build a time-series model of purchases; and determine, from the time-series model of purchases for the retail customer and item category, one or more model features. A plurality of time-series models is generated from the one or more model features using an autoregressive integrated moving average (ARIMA), the plurality of time-series models including a date model and a rate model. A survival analysis is performed to determine a repurchase probability of an item within each item category. An ensemble model is generated from the date model, the rate model, and the survival analysis, the ensemble model providing a time series prediction of a next retail customer purchase date and items purchased on the date of the next retail customer purchase. A retail user interface from an online retailer is displayed, which includes a basket prediction for each retail customer, the basket prediction includes at least one item within each of a plurality of the item categories, the plurality of item categories selected from among the item categories and corresponding to highest-likelihood items purchased.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

As briefly described above, embodiments of the present invention are directed to predicting relevant items to be presented to a user in an online environment. The methods and systems described herein generate models based on previous item selections to determine an overall time series model for predicting a relevant time of next item selection as well as items most likely to be selected at that time. Complementary items can be presented to the user alongside the selection of most relevant items.

In the retail context, the prediction of items, including complementary items, can take the form of a shopping basket prediction system, where, based on past purchases of a customer, the next shopping basket of that customer is predicted. Predicting the next shopping basket includes considering specific item classes to determine which specific classes of items has been purchased in the past (with some degree of regularity) and is then used to predict shopping behavior for at least "frequent" items (e.g., items purchased more than X times in the past predetermined amount of time).

Such an arrangement has particular advantages, especially in a retail environment, and in particular in an online retail environment for a retailer having complementary physical store sales. With continued integration of online and in-store sales systems, as well as blended delivery models (e.g., online purchase and in-store pickup, in-store order for delivery, etc.) accurate capture of information and accurate recommendations can allow an in-store shopper with limited time to devote that time to browsing "elective" items, rather than these recurring purchase items likely to be included on the user's shopping list, and which require time to select/gather. By allowing users to quickly select items in an online context, a store service could be used to order and either deliver items or have those items available for pick-up, freeing the user/customer's time for browsing other items.

The methods and systems described herein therefore provide an online environment in which a user experience in selecting desired items is simplified. In particular, a user interface in which a limited selection of items can be presented in which the selection of items ins not driven by a particular category or only by those items which were recently purchased, bur rather by historical purchase, estimated consumption rate, and timing of repurchase. As such, the user interface presented herein may be able to present to the user a smaller set of desirable items, without extraneous or inaccurate items which take up unnecessary space within the user interface and may distract the user.

Figure 1:
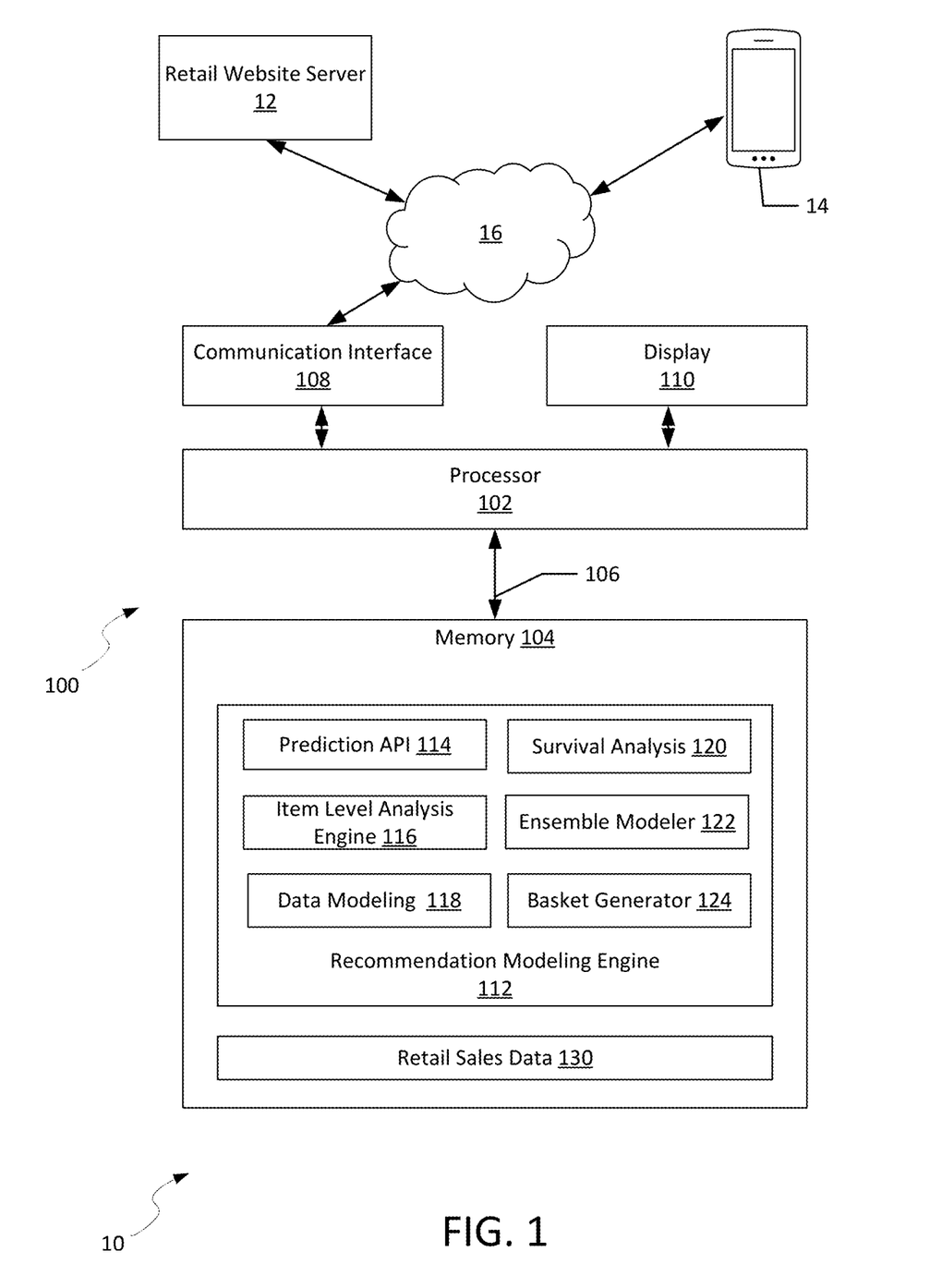
FIG. 1 illustrates a system for presenting items in an online environment based on previous item selections, and in particular in a retail context, according to an example embodiment.

FIG. 1 illustrates a system 10 for presenting items in an online environment based on previous item selections, and in particular in a retail context, according to an example embodiment. The system includes a recommendation modeling computing system 100, communicatively connected to a retail web server 12 and a user device 14 via network 16 (e.g., the Internet). The retail web server presents items to a user device, which displays such items to the user via either a browser or application.

The recommendation modeling computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components. In the embodiment shown, the memory 204 stores a recommendation modeling engine 112, discussed in further detail below. The computing system 100 can also include a communication interface 108 configured to receive and transmit data, for example to access data in an external database. Additionally, a display 110 can be used for viewing recommendation information generated by engine 112.

In various embodiments, the recommendation modeling engine 112 includes a prediction Application Programming Interface (API) 114, an item level analysis engine 116, a data modeling component (ARIMA Modeler) 118, a survival analysis component 120, an ensemble modeler 122, and a basket generator 124. Optionally, an offer incorporation system can be used (not shown) which integrates offers complementary to the items identified in the basket generator, either within the retail sales prediction engine 112 or within the retail website server 12.

The Application Programming Interface (API) 114 is exposed to external systems and allows such systems to query, for a particular user, item recommendations to be provided to that user. The API can respond (e.g., via XML or similar markup language document) with a listing of a plurality of items in various formats, which indicate likely items to be recommended to a user in accordance with operation of the retail sales prediction engine 112, as discussed below.

The item level analysis engine 116 analyzes data, such as retail sales data 130, to determine item level data for a particular user. This can include, for example, identifying specific sales data associated with the user, as well as identifying specific items included in that sales data. This is described in more detail with regard to FIGS. 2-7 below. The user can be identified by a customer identifier, such as an account number with a retailer. The item level analysis engine 116 can also categorize the items into generalized item categories and subcategories for purposes of generating recommendations on an item/category level, as described in more detail below.

The data modeling component 118 can generate a plurality of data models from the item level data. For example, the data modeling component 118 can generate a time-series model (or more than one such time series model) from the item level data for each user, reflecting the frequency of purchase of particular items, or likelihood of purchase of each item. The data modeling component 118 can also generate a time series model of likelihood of a selection event for a user, for example, a likelihood of a store visit or online shopping event.

In example implementations, the data modeling component 118 is implemented using an autoregressive integrated moving average (ARIMA) model, used to time series data and predict future points in the time series. In such implementations, a date model and a rate model can be determined. The data model models the difference in dates of purchases as a time-series sequence to attempt to estimate a next shopping/selection event. The rate model models a rate of consumption of each item purchased, to estimate when the user will be required to purchase more. Additional information associated with the modeling is provided below.

The survival analysis component 120 determines overall population behavior when selecting (e.g., purchasing) an item. For example, a survival analysis can be performed to determine the chance that a particular user may require a particular item within x days of the last selection. This analysis is not performed on a per-user basis, but rather on a per-item basis across users, and therefore provides an estimate as to how people overall are consuming selected items. For such survival analysis, survival, hazard, and cumulative hazard features are modeled. This allows the survival analysis component to determine for each guest what recurring item is purchased, how many days ago, and what fraction of population may be interested in buying the item given that time sequence after the number of days has passed.

The ensemble modeler 122 obtains the output of the data modeling component 118 and the survival analysis component 120, as well as optional additional features, for inclusion in an ensemble approach. Such an ensemble approach can used, for example, a random forest model, or may use gradient-boosted trees.

The basket generator 124 generates a basket matrix for a given user that is valid for the time at which a request is received via the prediction API 114. The basket matrix can be, for example, a two dimensional matrix of items, with rows representing separate item categories in order of likelihood of selection (from highest to lowest) and columns representing individual items within each category in order of likelihood of selection (from highest to lowest). The matrix can be any size, but typically will be cut off at a predetermined or statistically significant size (e.g., when selection or purchase is mathematically unlikely).

Optionally, the basket generator 124 can modify the basket by adding to the basket a particular additional set of items based on offers to be made or incentives to be offered to a user. For example, items may be added to the basket if there is a current promotion on that item.

Figure 8:
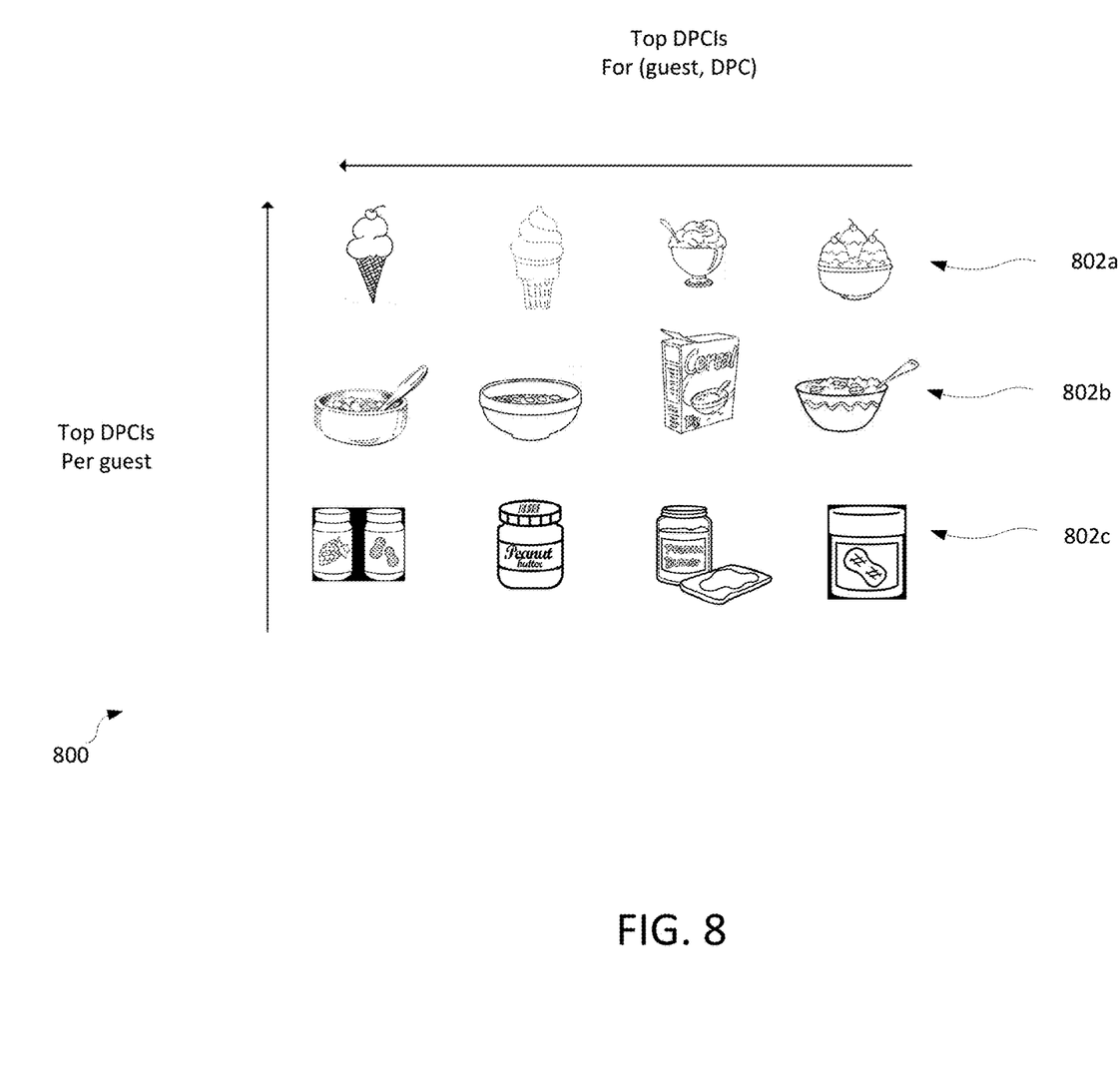
FIG. 8 illustrates an example basket prediction matrix from which a basket prediction can be generated, in an example implementation.
Figure 9:
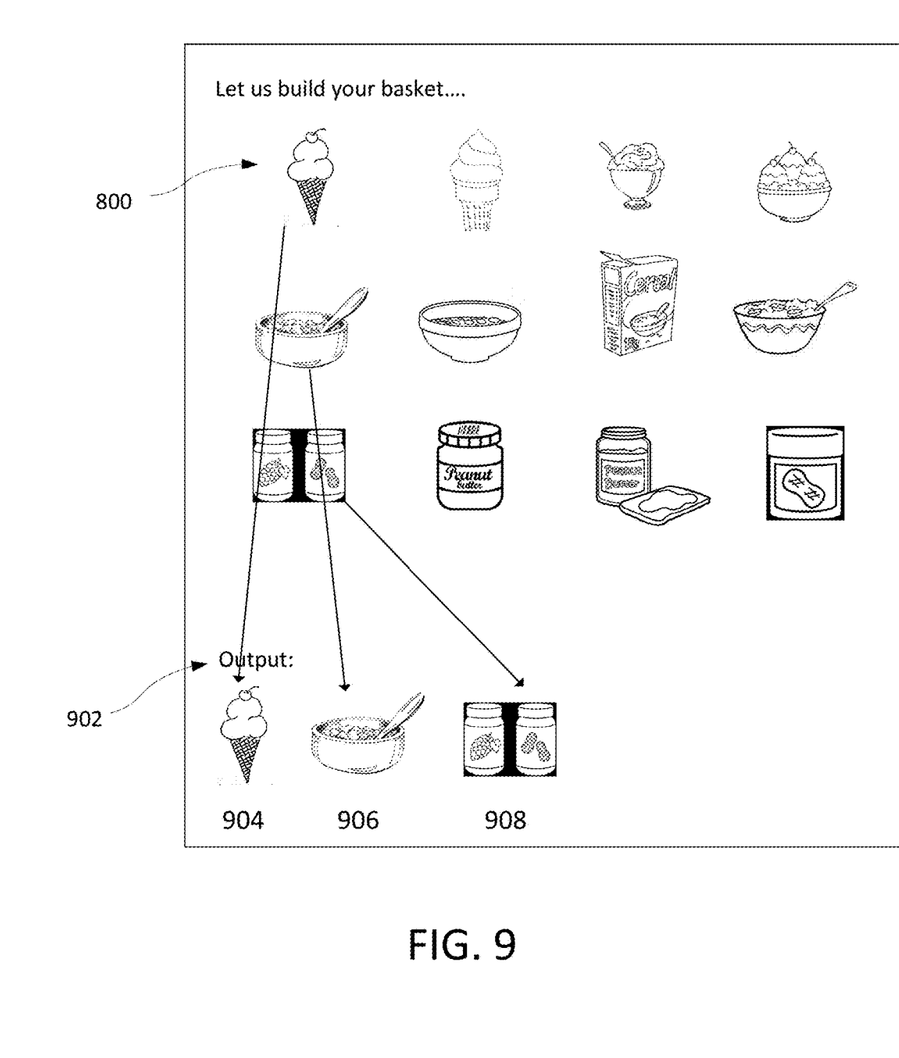
FIG. 9 illustrates an example basket prediction generated from a basket prediction matrix, in an example implementation.

The computing system 100 can provide the basket matrix, or in particular, items selected from the basket matrix (e.g., as illustrated in FIGS. 8-9) to a retail web server 12, e.g., for delivery to a user device 14 in response to a request from that device. Example user interfaces 14 for providing such recommendations are provided in greater detail below.

Figure 2:
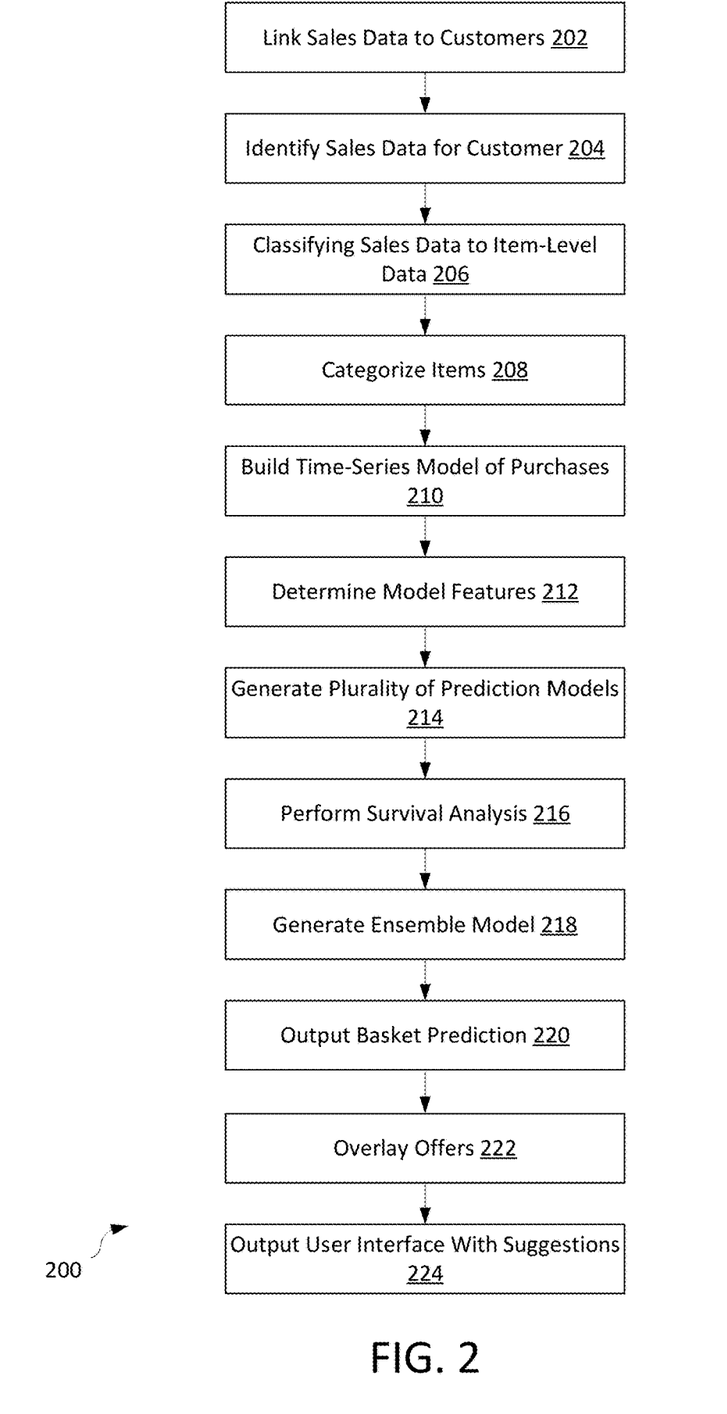
FIG. 2 illustrates a flowchart of a method for presenting items in an online environment based on previous item selections, according to an example embodiment.

FIG. 2 illustrates a flowchart 200 of a method for presenting items in an online environment based on previous item selections, according to an example embodiment. The method 200 can be performed using the system 10 of FIG. 1, above, and in particular the recommendation modeling computing system 100.

Figure 3:
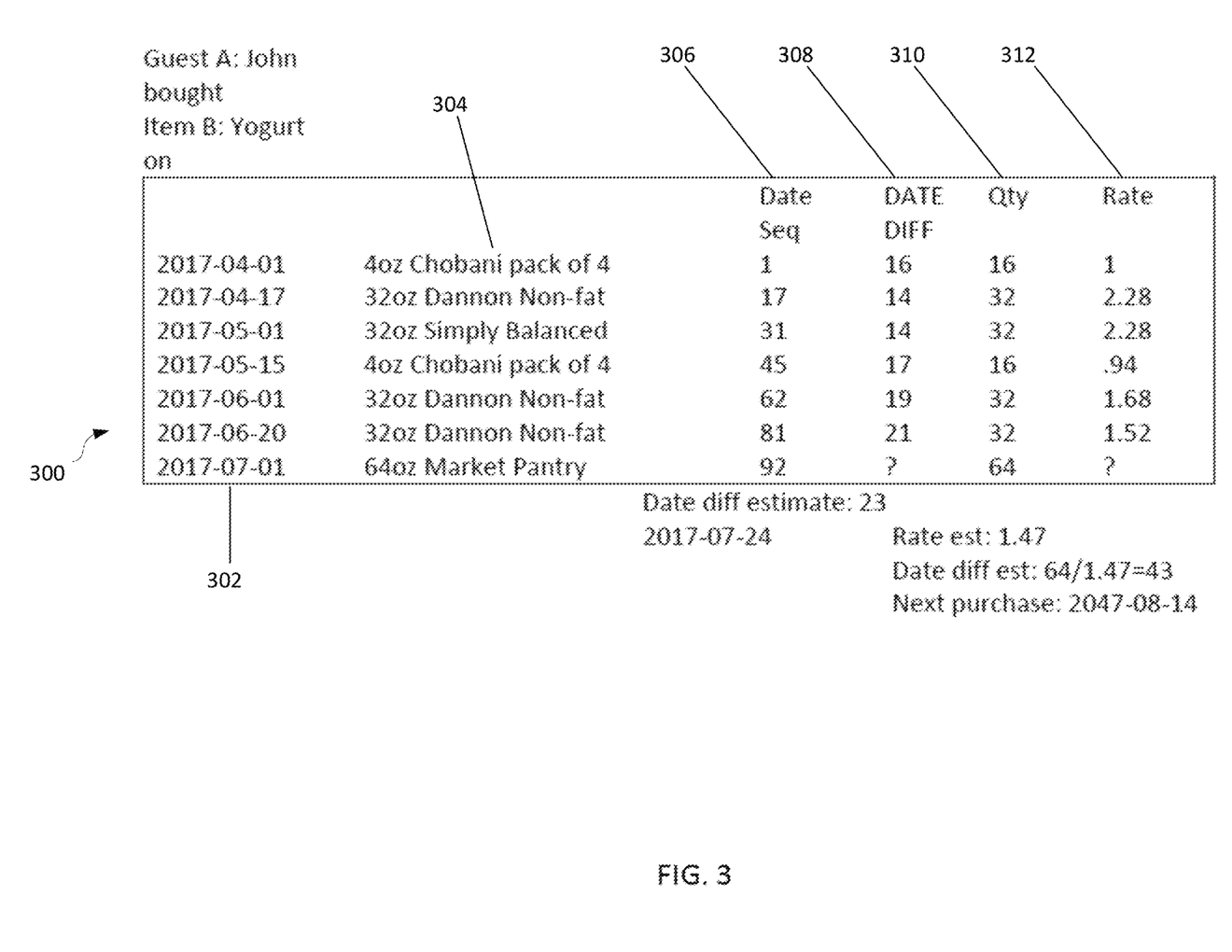
FIG. 3 illustrates a time series log of item selection data associated with a particular user, in particular, sales data associated with a retail customer, according to an example embodiment.

At 202, sales data is linked to customers, for example by user identifier. Once sales data is linked, at 204, specific sales data for a customer can be identified, e.g., based on a request identifying that customer received via an API 114 as noted above. FIG. 3 illustrates a time series log 300 of item selection data associated with a particular user and a particulate item category, in particular, sales data associated with a retail customer, according to an example embodiment.

Time series log 300 includes dates 302, item description 304, date sequence 306, date difference 308, quantity 310, and rate 312. As shown, the quantity 310 and date difference 306 is used to determine the rate 312. The date difference 308 is also used to predict when the customer will make the next purchase and how much they will purchase.

In some embodiments, user sales data can be acquired for the past 18 months, although in other arrangements, other amounts of data could be used. For simplicity, in some embodiments, only recurring sales data (data for sales of items that are purchased 3 or more times within that timeframe) are used.

At 206, the user sales data can be classified into item level data, which includes identifying specific items within the sales data, and, at 208, categorizing the items into specific categories and sub-categories having sufficient granularity that it is likely that a user would select only one type of item from within that category at a given occurrence.

At 210, a time series model of purchases from the user is generated. From the models, a set of model features can be determined, at 212. Finally, a plurality of prediction models can be generated at 214. In example embodiments, the time series model is generated using an autoregressive integrated moving average (ARIMA) model, to generate time series data and predict future points in the time series. In example retail embodiments, the model is used to make a guess on when the customer would be running out of an item.

Considering the purchase dates of an item to be a time series, the model predicts the next time the user/customer would need the item. Similarly, considering the consumption rate of item (say 3.2 oz per day), the modeling process attempts to estimate when the user will need that item. This analysis is at the user level, and therefore the predictions are made customized to the behavior of each user.

Although example embodiments are directed towards consumable products, other types of products are considered. For example, the model could predict the needs of a customer who is purchasing clothing for an aging child. The model predicts clothing items that are similar in style to previous purchases, but in appropriate sizes.

In example embodiments, two independent ARIMA time series are used for generation of predictions. A date model is used to model the difference in dates of purchases as a time-series sequence, to try to estimate when the user will shop next. A rate model is used to model the rate of consumption of the item purchased, to estimate when the user will run out of the item and shop next. In the example data of FIG. 3, a hypothetical customer John purchased yogurt on subsequent trips to a retailer. As seen in FIG. 3, a date model can be generated (the "Date Seq" 306 and "DATE DIFF" 308 columns) and a rate model can be generated as well (reflected by the "Qty" 310 and "Rate" 312 columns). In example implementations, a Spark-ts software package can be used to implement the ARIMA-based modeling.

At 216, a survival analysis is performed. This survival analysis is used to determine overall population behavior in purchasing a particular item. For example, customers may purchase bananas every 7 days, but may run out of diapers every 21 days. Alternatively, chances a customer will need banana or diapers on the 15th day after the purchase can be determined. This analysis is not user-specific, but rather is performed across a population. This provides an estimate as to how customers select items. The useful features are survival, hazard, and cumulative hazard. In example embodiments, for each user, it is determined what recurring item is bought and how many days ago it was purchased. Then the fraction of population who would still be interested in buying or have bought this item after the number of days is determined. The output of both the models, and some more features, are input to an ensemble approach (Gradient-boosted trees), at 218.

In the survival analysis (as performed at 216), to understand the repeat pattern of different items (at DPC level) in the inventory, the analysis is typically used for analyzing the expected duration of time until one or more events happen, such as times to next purchase. To calculate the survival analysis, the set of items under DPC are treated as an entity and compared the times between purchases of any of these items by the same customer.

Figure 4:
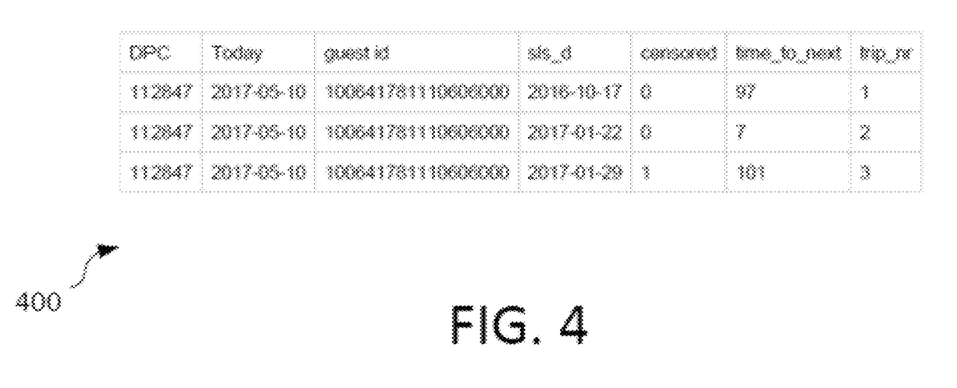
FIG. 4 illustrates an example set of survival analysis data for a particular user.

In an example implementation, only data in the T-29 to T-550 days-window is considered. Any purchase that is not followed with a repeat purchase event by T-29 is a censored observation, and the time of this censoring is calculated as the time between the purchase and the offer start date (or the current date, if the offer starts in the future). For these censored observations, the exact event time is unknown, but only that the event time is greater than the time at the point of censoring. A table 400 seen in FIG. 4 summarizes the events and censored cases across time in one example data set.

Figure 5:
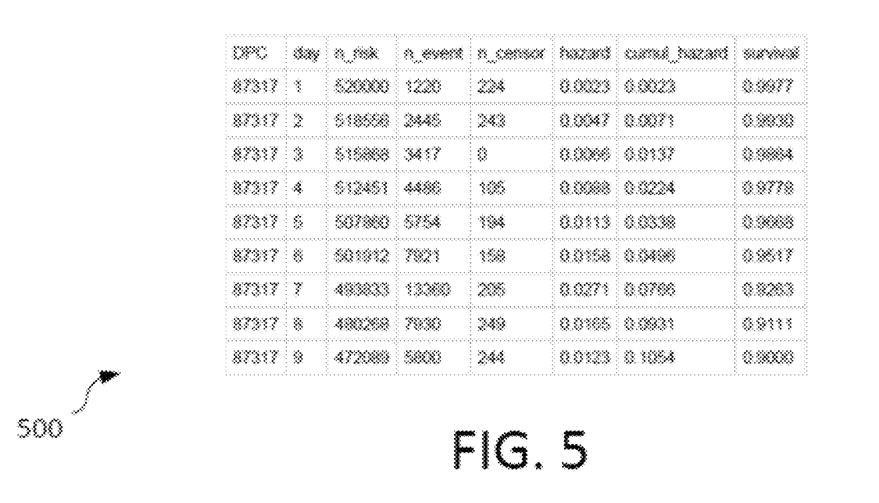
FIG. 5 illustrates an example set of survival analysis data for a particular item.

As shown in FIG. 5, data of repeat purchase times can be used to construct a life table 500 across guests for each offer, which will allow prediction of repeat purchase risk as a function of time. At time 0, all observations (reference purchases) are still at risk: they have not yet repeated the purchase (event) or been censored. As events and censored cases occur, observations fall out of the risk set. Using a life table such as the table 500, survival analysis for a particular item is provided, for which certain features can be computed to obtain observations.

The following features are input to the model: hazard, hazard (till day), survival (day), survival (week), risk (normalized), number of times item bought (in 1.5 years), predicted date using ARIMA Rate Model, predicted date using ARIMA Date Model, trips made by customer since last purchase, and days since last purchase.

Hazard corresponds to a probability of an event occurring at time t, conditional on the event not occurring before time t:

$$hazard_t = n\_event_t / n\_risk$$

Cumulative hazard corresponds to a cumulative sum of hazard over time:

$$cumulative\_hazard = -1 * \ln(survival)$$

Survival corresponds to a probability of an event occurring after time t, or equivalently, the proportion that have not yet experienced the event by time t:

$$survival = \exp(-1 * cumulative\_hazard)$$

As to the ensemble model computed at 218, in example embodiments, a Gradient Boosted Tree model in Spark ML 2.0.0 is used to serve as an ensemble to merge the recommendations of competing models described earlier (rate model, date model, and survival) as well as incorporate other input features.

At 220, a basket prediction is generated. Within a DPC, a customer may have purchased multiple items. For example, a customer may have purchased Simply Balanced as well as Chobani yogurt in plain non-fat/vanilla/other flavors. These items are ranked (a) in terms of frequency—the one which is most frequently purchased is ranked on top; (b) in terms of recency—the one bought most recently will be ranked on the top. An example of a basket matrix 800 is illustrated in FIG. 8. These two features are then combined into a single rank by picking one each from the alternate lists provided the items are not repeated, as illustrated in FIG. 9. The ranked categories are based on values determined from the item and survival analysis, and assigned values normalized on a 0-1 scale, and rank ordered for purposes of determining appropriate categories for inclusion in the basket prediction.

At 222, the items selected for inclusion in a basket builder are output to a user interface, e.g., by a retail web server. The items that are included in the user interface can include fewer than all items included in a basket matrix 800 that is generated at 220, or can include all such items.

At 224, the suggested items selected for inclusion in a basket are output to the user interface. The user can opt to add none, some, or all of the items to a basket for checkout. The suggested items can be updated daily. Further, the user can opt to remove an item from further suggestion.

Figure 6:
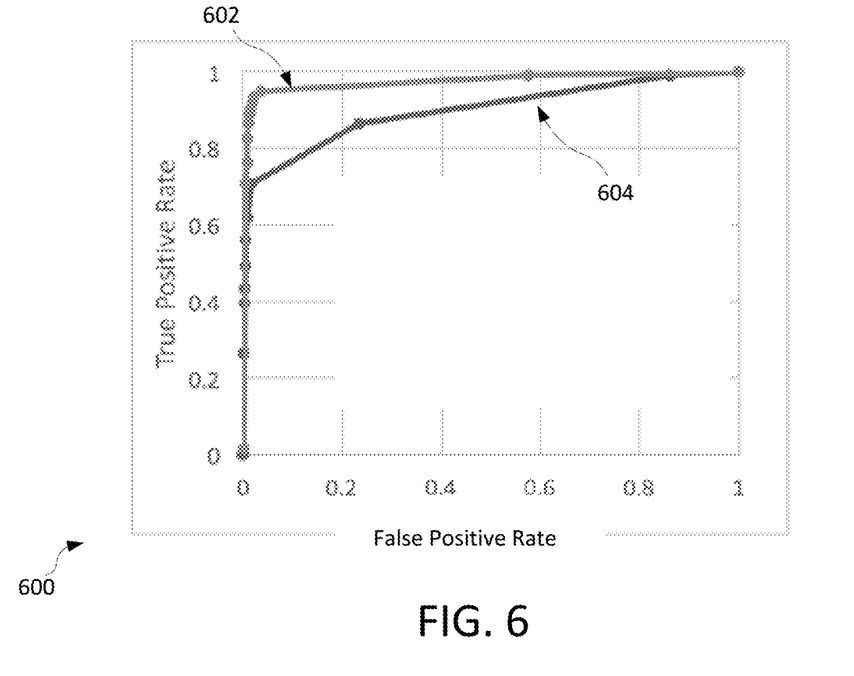
FIG. 6 is a chart illustrating true and false positive rates for predicting item selections, comparing first and second ensemble models, in example implementations.
Figure 7:
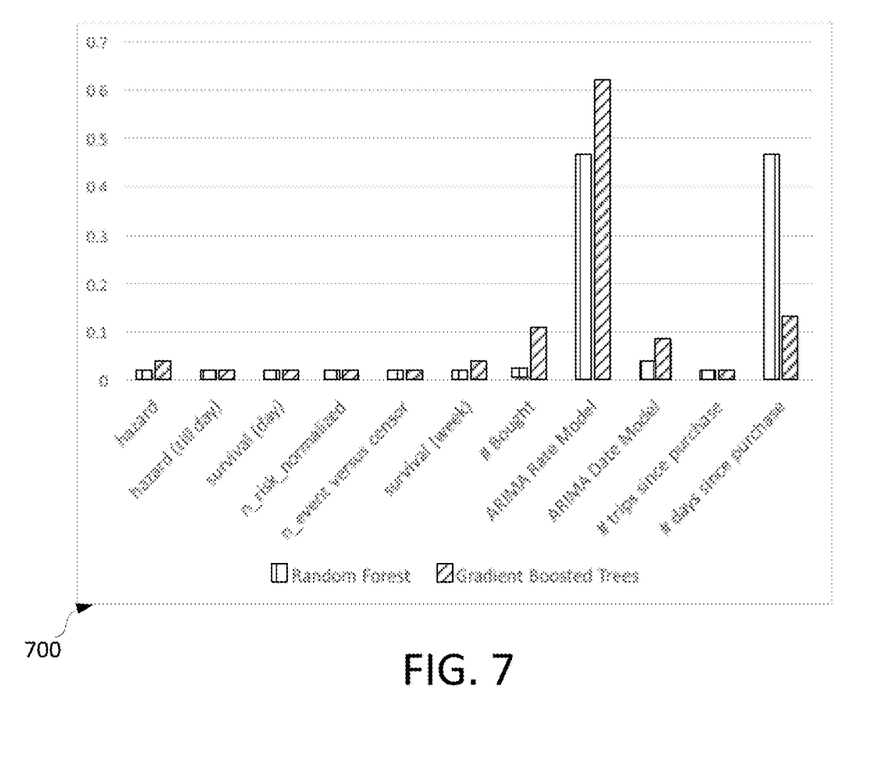
FIG. 7 is a chart illustrating importance of input features to the accuracy of first and second ensemble models, in an example implementation.

Referring to FIGS. 6-7, example sets of analysis data are provided illustrating effectiveness of the basket builder system described herein. At FIG. 6, a chart 600 illustrating true and false positive rates for predicting item selections, comparing first and second ensemble models, is shown for a particular sample dataset. Line 602 illustrates the rates for a random forest+ARIMA+survival (hereinafter "random forest"). Line 604 represents the rates for gradient boosted trees+ARIMA+survival (hereinafter "gradient boosted trees"). To test the performance of the model, the dataset was divided into train and test splits (70:30 split). The models were trained on training data and the performance was measured over testing data. A receiver operating curve statistics for the random forest model and gradient boosted trees model are shown in FIG. 6. Both the curves have positive performance. The AUC (area under curve) for random forest is 0.89 while AUC is 0.97 for gradient boosted trees. Both models are trained with 15 trees. For random forest, the best result were obtained for threshold=0.3, accuracy=0.88, recall=0.71, precision=0.96, and F-measure=0.81. For random forest, the best result were obtained for threshold=0.3, accuracy=0.96, recall=0.93, precision=0.96, and F-measure=0.94. Such features and accuracy measures may vary by dataset, training data, and implementation.

FIG. 7 is a chart 700 illustrating the importance of input features to the accuracy of first and second ensemble models in an example implementation. In particular, the objective is to rank the DPCs, to determine which DPCs are most likely to be bought by the customer in next trip. Thus, the model is trained as a regression model (instead of classification). The ROC and AUC are obtained by using appropriate thresholds. The Gradient Boosted Model is selected because of its superior performance. The importance of input features, as given by the two ensemble methods (random forest and gradient boosted trees) is shown in the chart 700. Specifically, it can be seen that ARIMA rate model has the highest predictive power, followed by the number of days since the last purchase of an item, ARIMA date model, and number of times the customer has bought the item. ARIMA model also eclipses the basic survival features and there is little impact of survival features on predicting customer purchase prediction.

FIG. 8 illustrates an example basket prediction matrix 800 from which a basket prediction can be generated, in an example implementation. While making a basket prediction matrix 800 for each customer, that customer is scored using the model trained in last step. Then the DPCs 802a, 802b, 802c, (item subcategories) are ranked for a customer in the order of regression score from the gradient boosted tree model. A sample output for a guest may appear as seen in FIG. 8, in which each row represents a ranked list of items within a particular subcategory, while each column represents top, next, etc. choice of DPC (specific item) within a subcategory. A further example of such a basket matrix is illustrated in Table 1, below.

TABLE 1

Example Basket Matrix

| Category | Product 1 | Product 2 | Product 3 |
| --- | --- | --- | --- |
| Milk | Simply Balanced ½ Gallon 1% milk | Simply Balanced Unsweetened Almond Milk | Kemps ½ Gallon Whole Milk |
| Bread | Simply Balanced Nutgrain | Simply Balanced 12-grain | Cottage Bread - White Bread |
| Yogurt | Oui - Strawberry | Oui - Blueberry | Chobani - Vanilla |

FIG. 9 illustrates an example basket prediction 902 generated from a basket prediction matrix 800, in an example implementation. In FIG. 9, items can be selected from the basket prediction matrix by filtering or adding items. In an example implementation, for online placement, items are filtered out that are not available on the website and are removed from the predicted basket. A single-line carousel, the basket prediction 902 is shown to customers. In alternative embodiments, different user interfaces or outputs can be provided. If transmitted via the API, a customer/cookie ID is provided to the API and it gives a list of TCINs and their placement in the webpage. This basket prediction 902 is provided to customers by compute layer per customer daily. When an item is added to cart, that line would be ranked to the bottom of the page (not compulsory).

Figure 11:
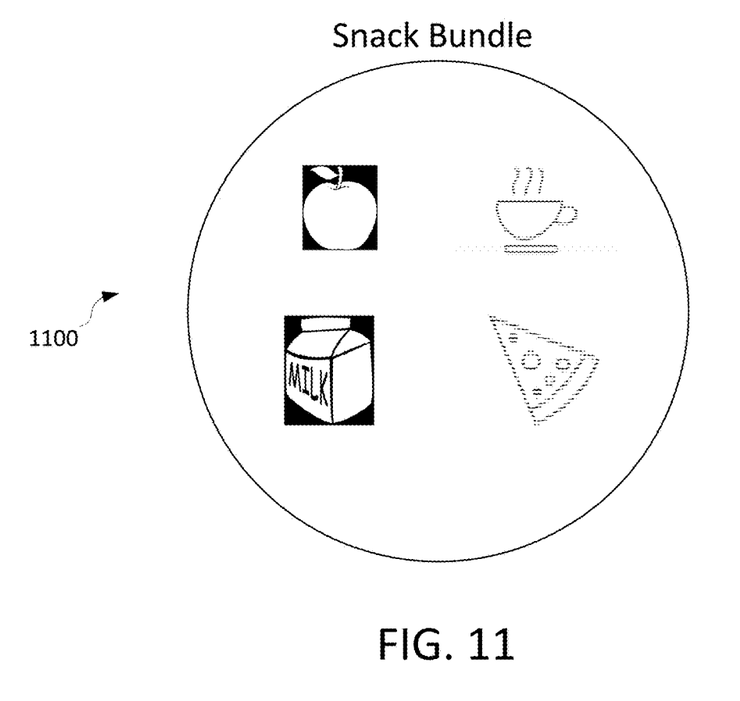
FIG. 11 illustrates an example offer pool for a set of snack products, based on a set of offer data for a particular retail customer, in an example implementation.
Figure 12:
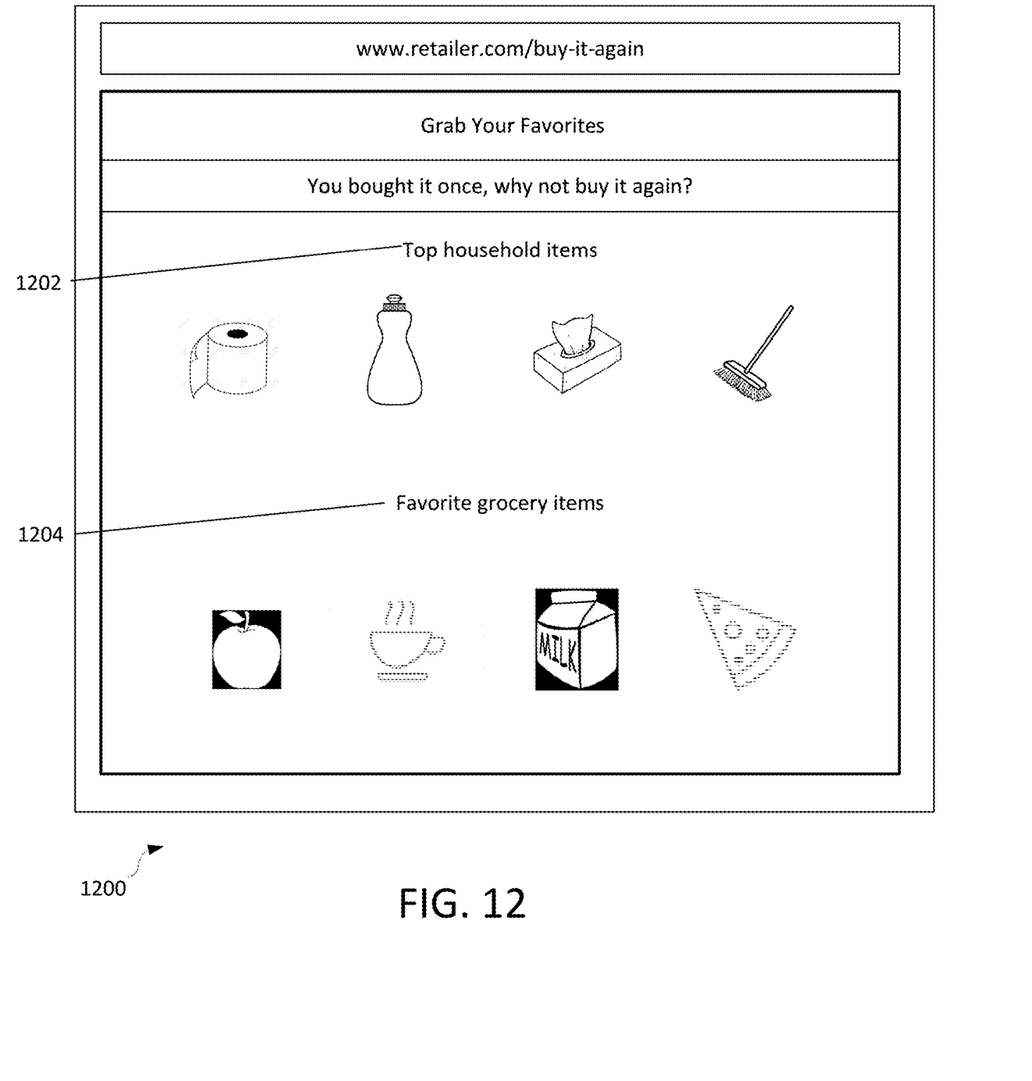
FIG. 12 illustrates a retailer interface useable for providing item recommendations, according to an example implementation.

In additional example embodiments, a personalized system may be implemented such that "basket level" offers (e.g., deals on groups of common products in an offer pool, such as offer pools 1100, 1200 of FIGS. 11-12) are presented to the user. Such offer pools can include a collection of items from similar categories, in combination with sale or clearance items for a customer. This can leverage a model to find groups of similar products on sale, and layering a customer's searching history thereon (with recommended products being the browsed items that are also on sale/clearance).

Figure 10:
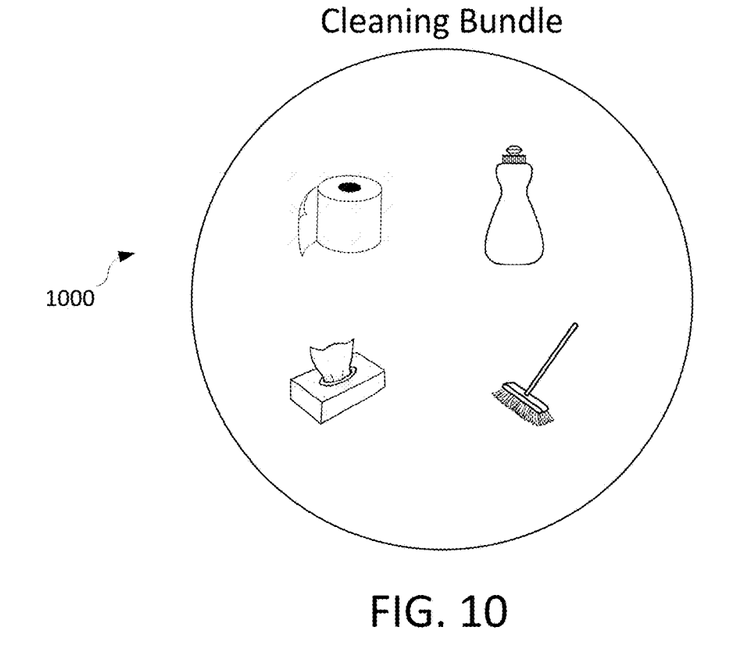
FIG. 10 illustrates an example offer pool for a set of cleaning products, based on a set of offer data for a particular retail customer, in an example implementation.

In a first example, an offer pool 1000 is a cleaning bundle comprising four cleaning items. In another example, an offer pool 1100 is a snack bundle comprising four snack items. Offer pools may consist of any number of items, for example, from two to ten items.

FIG. 12 illustrates a retailer interface 1200 useable for providing item recommendations, according to an example implementation. The retailer interface 1200 can be presented within a retailer website, such as may be provided by a retail web server 12 as noted above. The retailer interface 1200 can be presented to a user a set of recommended products, e.g., as categorized by item type (category 1202, 1204) or by highest likelihood of purchase. Still further, offer pools (as in FIGS. 11-12) could be included in a group of recommendations. As seen in the example, a selection of items can be presented to a user based on information returned to the retail web server 12 from the API 114 of system 100. The specific recommendations will change according to which customer reaches the website, as well as the time the user arrives at that website (based on the survival analysis) and any changes to the purchase/selection history, as noted above.

Although the retailer interface 1200 is presented within a browser window application, it is noted that different retailer interfaces could be presented in the alternative. For example, all or a subset of the basket prediction matrix could be presented to a user within a retailer website or mobile application. For example, only a top rated item within each of a predetermined number of categories could be presented to a user for selection; in alternative arrangements, a predetermined top number of items could be displayed within the predetermined number of item categories. The number of item categories could be selected based on a detected format of the user interface or size of screen on which the retailer interface is to be displayed.

Referring to FIGS. 1-12 generally, it is noted that there are a number of advantages over existing systems provided by the above methodology for predicting item selections. For example, in the retail context, a customer may save substantial time by pre-selecting items in a website or application user interface, providing that customer with additional time to shop for other items. Additionally, relative to other prediction systems, which simply display past purchases and related items, the present systems will recommend items to the user based on not just past purchase or browsing history, but also an expected time at which that user may in fact need the item to be purchased based on consumption rate of the item. As such, items of more appropriate volume, or items having an appropriate appearance frequency will appear to the customer. This results in a more accurate item selection algorithm, as well as a resulting simplified user interface that presents only most accurate results to a user, thereby allowing the user interface to be presented on, e.g., smaller format screens, and/or without extraneous items which may be visually distracting to a user.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method of generating an item recommendation to a retail customer, the method comprising:
   identifying sales data associated with a retail customer based on historical sales being associated with an identifier of the retail customer, the sales data including recurring sales data representing sales of items purchased a plurality of times within a predefined time period;
   classifying the sales data into item level data, wherein the item level data includes frequency and timing of the retail customer's historical purchase of items;
   for each item, identifying an item category;
   for each retail customer and each item category, building a time-series model of purchases;
   determining, from the time-series model of purchases for the retail customer and item category, one or more model features;
   generating a plurality of time-series models from the one or more model features for the retail customer, the plurality of time-series models including a date model generated using an autoregressive integrated moving average (ARIMA) model and a rate model generated using a second ARIMA model, the rate model being independent of the date model;
   performing a survival analysis on a per-item basis across a plurality of retail customers, the plurality of retail customers including the retail customer, individually for the retail customer, to determine a repurchase probability of an item within each item category, the repurchase probability being determined within a repurchase period from a cumulative hazard function;
   at a Gradient-Boosted Tree-based ensemble model, combining predictions from at least the date model, the rate model, and the survival analysis, to generate a time series prediction of a next retail customer purchase date and items purchased on the date of the next retail customer purchase;
   receiving a request generated from a retail website to generate a basket prediction for the retail customer;
   based on a date at which the request to generate the basket prediction is received, identifying highest-likelihood items to be purchased based on the ensemble model prediction on the date at which the request is received, the highest-likelihood items being selected from across a plurality of item categories;
   using the identified highest-likelihood items to be purchased, generating and displaying a basket prediction matrix for the retail customer, the basket prediction matrix being a two-dimensional matrix having a plurality of rows comprising ranked item categories and a plurality of columns comprising a plurality of items within each category ranked based at least in part on frequency and timing of the retail customer's historical purchases;
   in response to generating the basket prediction matrix, outputting in real-time a basket prediction for the retail customer, the basket prediction including the highest ranking item in each item category within the basket prediction matrix;
   determining a format of a user interface displayable on a device associated with the retail customer, wherein the format includes a size of a display screen;
   based on the determined size of the user interface, determining a maximum number of items and a maximum number of item categories to be displayed in a carousel;
   in response to the determined size of the user interface, adapting the carousel to display the determined maximum number of items, wherein the carousel is configured to display items across the plurality of item categories in response to determining the maximum number of items and the maximum number of item categories;
   generating at least a portion of the user interface including the carousel, the carousel including the determined maximum number of items, wherein each item displayed in the carousel is from the basket prediction on the date at which the request to generate a basket prediction is received;
   receiving a selection from the retail customer through the user interface, of at least one of the items from the basket prediction via the carousel and adding the selected at least one item to a basket for checkout; and
   based, at least in part, on receiving the selection of the at least one item through the user interface to add to the basket for checkout, updating the time-series model of purchases for the retail customer.

2. The method of claim 1, wherein the survival analysis applies a survival function based on likelihood of repurchase of an item within the item category for each of the plurality of retail customers.

3. The method of claim 1, wherein the survival analysis for a particular item is performed based on a plurality of features including a daily survival rate for the particular item, a weekly survival rate for the particular item, a number of trips made by the retail customer since last purchase of the particular item, a number of days since the retail customer has purchased the particular item, and a number of times the particular item has been purchased by the retail customer within a predetermined time period.

4. The method of claim 1, wherein outputting the basket prediction comprises providing the basket prediction to the retail website.

5. The method of claim 1, wherein the identifier of the retail customer links the retail customer to item purchases based on matching of payment information to the retail customer and to the item purchases.

6. The method of claim 1, further comprising obtaining promotion information associated with at least one item, and wherein the basket prediction includes one or more items associated with a promotion.

7. The method of claim 1, wherein the basket prediction includes one or more items identified to be frequently purchased in combination with items previously purchased by the retail customer.

8. The method of claim 1, further comprising obtaining feedback from a retail customer, wherein the feedback is to remove an item category from further basket prediction.

9. The method of claim 1, wherein the carousel is configured to display one item within a plurality of item categories and presenting the carousel including at least one item comprises presenting only a highest-likelihood item to be purchased from each of the plurality of item categories.

10. A retail item recommendation system comprising: a recommendation modeling computing system hosting a recommendation Application Programming Interface (API) exposed to a retail website server, the recommendation API configured to receive information identifying a retail customer and output a basket prediction for that retail customer;
   a recommendation modeling engine executing on the recommendation modeling computing system, the recommendation modeling engine configured to, when executed by a programmable circuit of the recommendation modeling computing system, perform:
      identifying sales data associated with a retail customer based on historical sales being associated with an identifier of the retail customer, the sales data including recurring sales data representing sales of items purchased a plurality of times within a predefined time period;
      classifying the sales data into item level data, wherein the item level data includes frequency and timing of the retail customer's historical purchase of items;
      for each item, identifying an item category;
      for each retail customer and each item category, building a time-series model of purchases;
      determining, from the time-series model of purchases for the retail customer and item category, one or more model features;
      generating a plurality of time-series models from the one or more model features for the retail customer, the plurality of time-series models including a date model generated using an autoregressive integrated moving average (ARIMA) model and a rate model generated using a second ARIMA model, the rate model being independent of the date model;
      performing a survival analysis on a per-item basis across a plurality of retail customers including the retail customer, individually for the retail customer, to determine a repurchase probability of an item within each item category, the repurchase probability being determined within a repurchase period from a cumulative hazard function;
      at a Gradient-Boosted Tree-based ensemble model, combining predictions from at least the date model, the rate model, and the survival analysis, to generate a time series prediction of a next retail customer purchase date and items purchased on the date of the next retail customer purchase;
   receiving a request generated from a retail website to generate a basket prediction for the retail customer;
   based on a date at which the request to generate the basket prediction is received, identifying highest-likelihood items to be purchased based on the ensemble model prediction on the date at which the request is received, the highest-likelihood items being selected from across a plurality of item categories;
   using the identified highest-likelihood items to be purchased, generating and displaying a basket prediction matrix for the retail customer, the basket prediction matrix being a two-dimensional matrix having a plurality of rows comprising ranked item categories and a plurality of columns comprising a plurality of items within each category ranked based at least in part on frequency and timing of the retail customer's historical purchases;
   in response to generating the basket prediction matrix, outputting in real-time a basket prediction for the retail customer, the basket prediction including the highest ranking item in each item category within the basket prediction matrix;
   determining a format of a user interface displayable on a device associated with the retail customer, wherein the format includes a size of a display screen;
   based on the determined size of the user interface, determining a maximum number of items and a maximum number of item categories to be displayed in a carousel;
   in response to the determined size of the user interface, adapting the carousel to display the determined maximum number of items, wherein the carousel is configured to display items across the plurality of item categories in response to determining the maximum number of items and the maximum number of item categories;
   generating at least a portion of the user interface including the carousel, the carousel including the determined maximum number of items, wherein each item displayed in the carousel is from the basket prediction on the date at which the request to generate a basket prediction is received;
   receiving a selection from the retail customer through the user interface, of at least one of the items from the basket prediction via the carousel and adding the selected at least one item to a basket for checkout; and
   based, at least in part, on receiving the selection of the at least one item through the user interface to add to the basket for checkout, updating the time-series model of purchases for the retail customer.

11. The system of claim 10, wherein the survival analysis for a particular item is performed based on a plurality of features including a daily survival rate for the particular item, a weekly survival rate for the particular item, a number of trips made by the retail customer since last purchase of the particular item, a number of days since the retail customer has purchased the particular item, and a number of times the particular item has been purchased by the retail customer within a predetermined time period.

12. The system of claim 10, wherein outputting the basket prediction comprises providing the basket prediction to the retail website.

13. The system of claim 10, wherein the identifier of the retail customer links the retail customer to item purchases based on matching of payment information to the retail customer and to the item purchases.

14. The system of claim 10, wherein the basket prediction includes one or more items identified to be frequently purchased in combination with items previously purchased by the retail customer.

15. The system of claim 10, further comprising obtaining promotion information associated with at least one item, and wherein the basket prediction includes one or more items associated with a promotion.

16. A retail web server system configured for providing a retail item recommendation, the system comprising:
 a computing system comprising at least one processor communicatively connected to a memory, the memory storing computer-executable instructions comprising a software tool which, when executed causes the system to:
  identify sales data associated with a retail customer based on historical sales being associated with an identifier of the retail customer, the sales data including recurring sales data representing sales of items purchased a plurality of times within a predefined time period;
  classify the sales data into item level data, wherein the item level data includes frequency and timing of the retail customer's historical purchase of items;
  for each item, identify an item category;
  for each retail customer and each item category, build a time-series model of purchases;
  determine, from the time-series model of purchases for the retail customer and item category, one or more model features;
  generate a plurality of time-series models from the one or more model features for the retail customer, the plurality of time-series models including a date model generated using an autoregressive integrated moving average (ARIMA) model and a rate model generated using a second ARIMA model, the rate model being independent of the date model;
  perform a survival analysis on a per-item basis across a plurality of retail customers, the plurality of retail customers including the retail customer, individually for the retail customer, to determine a repurchase probability of an item within each item category, the repurchase probability being determined within a repurchase period from a cumulative hazard function;
  at a Gradient-Boosted Tree-based ensemble model, combining predictions from at least the date model, the rate model, and the survival analysis, to generate a time series prediction of a next retail customer purchase date and items purchased on the date of the next retail customer purchase;
  receive a request generated from a retail website to generate a basket prediction for the retail customer;
  based on a date at which the request to generate the basket prediction is received, identify highest-likelihood items to be purchased based on the ensemble model prediction on the date at which the request is received, the highest-likelihood items being selected from across a plurality of item categories;
  using the identified highest-likelihood items to be purchased, generate and display a basket prediction matrix for the retail customer, the basket prediction matrix being a two-dimensional matrix having a plurality of rows comprising ranked item categories and a plurality of columns comprising a plurality of items within each category ranked based at least in part on frequency and timing of the retail customer's historical purchases;
  in response to generating the basket prediction matrix, output in real-time a basket prediction for the retail customer, the basket prediction including the highest ranking item in each item category within the basket prediction matrix;
  determine a format of a retail user interface from an online retailer, wherein the format includes a size of a display screen of a device associated with the retail customer;
  based on the determined size of the retail user interface, determine a maximum number of items and a maximum number of item categories to be displayed in a carousel;
  in response to the determined size of the retail user interface, adapt the carousel to display the determined maximum number of items, wherein the carousel is configured to display items across the plurality of item categories in response to determining the maximum number of items and the maximum number of item categories;
  generate at least a portion of the retail user interface including the carousel, the carousel including the determined maximum number of items, wherein each item displayed in the carousel is from the basket prediction for the retail customer on the date at which the request to generate a basket prediction is received;
  receive a selection from the retail customer through the user interface, of at least one of the items from the basket prediction via the carousel and add the selected at least one item to a basket for checkout; and
  based, at least in part, on receiving the selection of the at least one item through the user interface to add to the basket for checkout, updating the time-series model of purchases for the retail customer.

17. The system of claim 16, wherein outputting the basket prediction comprises providing the basket prediction to the retail website.

18. The system of claim 17, wherein the identifier of the retail customer links the retail customer to item purchases based on matching of payment information to the retail customer and to the item purchases.

* * * * *